United States Patent [19]

Kanazawa et al.

[11] Patent Number: 4,673,189
[45] Date of Patent: Jun. 16, 1987

[54] VEHICLE STEERING SYSTEM

[75] Inventors: Hirotaka Kanazawa; Takeshi Tanaka; Shigeki Furutani; Akihiko Miyoshi, all of Hiroshima, Japan

[73] Assignee: Mazda Motor Corporation, Japan

[21] Appl. No.: 875,968

[22] Filed: Jun. 19, 1986

[30] Foreign Application Priority Data

Jun. 22, 1985 [JP] Japan ................. 60-136551

[51] Int. Cl.[4] .............................. B62D 7/00
[52] U.S. Cl. ...................... 280/91; 180/141
[58] Field of Search ............. 280/91, 99; 180/140, 180/141, 142

[56] References Cited

U.S. PATENT DOCUMENTS

| 4,313,514 | 2/1982 | Furukawa et al. | 180/143 |
| 4,552,239 | 11/1985 | Kanazawa et al. | 180/141 |
| 4,572,316 | 2/1986 | Kanazawa et al. | 180/143 |
| 4,601,357 | 7/1986 | Miyoshi et al. | 280/91 |

FOREIGN PATENT DOCUMENTS

| 3338702 | 5/1984 | Fed. Rep. of Germany | 280/91 |
| 166564 | 8/1985 | Japan | 280/91 |

Primary Examiner—John J. Love
Assistant Examiner—Ross Weaver
Attorney, Agent, or Firm—Fleit, Jacobson, Cohn & Price

[57] ABSTRACT

A steering mechanism of a vehicle including a front wheel steering mechanism for steering front wheels of the vehicle, a steering handle wheel for effecting a steering movement of the front wheel steering mechanism to a desired angle, a rear wheel steering mechanism for steering rear wheels of the vehicle, a control circuit for effecting a steering movement of the rear wheel steering mechanism in relation with the steering movement of the front wheels. The arrangement is such that a ratio of the steering angle of the rear wheel to the steering angle of the front wheel as considered in the same direction of steering is increased in accordance with an increase in the steered angle of the front wheel.

6 Claims, 12 Drawing Figures

VEHICLE STEERING SYSTEM

BACKGROUND OF THE INVENTION

The present invention relates to a vehicle steering system and more particularly to a so-called four-wheel steering system wherein fore and aft wheels are steered simultaneously. More specifically, the present invention pertains to control means for controlling the steering angle of the rear wheels in relation to the steering angle of the front wheels.

DESCRIPTION OF THE PRIOR ART

It has already been proposed in four-wheeled vehicles to steer not only the front wheels but also the rear wheels for the purpose of obtaining an improved steering properties. For example, in the U.S. Pat. No. 4,313,514 discloses a vehicle steering system including a front wheel steering mechanism for steering the front wheels and a rear wheel steering mechanism for steering the rear wheels in accordance with the steering angle of of the front wheels. The rear wheel steering mechanism is related to the front wheel steering mechanism so that the rear wheel is steered in the opposite direction as the front wheel under a low speed vehicle operation and in the same direction under a high speed operation. It is alleged that with this control it is possible to suppress side slips of the vehicle in operation in a curved path.

It should however be noted that the proposed control is not satisfactory because the ratio of the steering angle of the rear wheel to the steering angle of the front wheel under a specific vehicle speed is maintained constant irrespective of a change in the steering angle of the front wheel. It has been recognized that the rate of change in the yaw rate of the vehicle increases as the steering angle of the front wheel increases so that the yaw rate rapidly increases when the front wheel is steered to a large angle, possibly resulting in a steering instability.

The U.S. Pat. No. 4,572,316 issued to H. Kanazawa et al. and assigned to the same assignee of the present invention teaches to change the ratio of the steering angle of the rear wheel to the steering angle of the front wheel so that the ratio isdecreased as the steering angle of the front wheel increases. However, the control disclosed in this patent does not solve the aforementioned problems of steering instability.

SUMMARY OF THE INVENTION

It is therefore an object of the present invention to provide a vheicle steering mechanism wherein the rear wheels are steered in relation to the steering movement of the front wheel in such a manner that a steering instability of the vehicle is suppressed even when the front wheel is steered to a large angular position.

Another object of the present invention is to provide a vehicle steering mechanism which includes means for controlling the steering angle of the rear wheel in a manner of being able to suppress the increase of the vehicle yaw rate.

According to the present invention, the above and other objects can be accomplished by a steering mechanism of a vehicle including front wheel steering means for steering front wheels of the vehicle, operating means for effecting a steering movement of said front wheel steering means to a desired angle, rear wheel steering means for steering rear wheels of said vehicle, control means for effecting a steering movement of said rear wheel steering means in relation with the steering movement of the front wheels, said control means including rear wheel steering angle setting means for determining a desired steering angle of the rear wheels in accordance with a steered angle of the front wheels and actuating means for moving said rear wheels to said desired steering angle of the rear wheels, characterized by front wheel steered angle detecting means for detecting the steered angle of the front wheels and producing a front wheel steered angle signal which is applied to said rear wheel steering angle setting means, said rear wheel steering angle setting means including means for determining said desired steering angle of the rear wheels so that a ratio of the steering angle of said rear weheel to the steered angle of said front wheel as considered in the same direction of steering is increased in accordance with an increase in the steered angle of the front wheel.

According to the features of the present invention, the rear wheel is steered in a direction wherein the vehicle yaw rate is suppressed. For example, where the rear wheel is steered in the same direction as the front wheel is steered, the steering angle of the rear wheel is increased at a higher rate in response to a given increse in the steering angle of the front wheel. Where the rear wheel is steered in the opposite direction to the direction of the steering movement of the front wheel, the steering angle of the rear wheel is increased at a smaller rate or even decreased in response to a given increase in the steering angle of the front wheel.

The above and other objects and features of the present invention will become apparent from the following description of preferred embodiments taking reference to the accompanying drawings.

DESCRIPTION OF THE PREFERRED EMBODIMENTS

Figure 1:
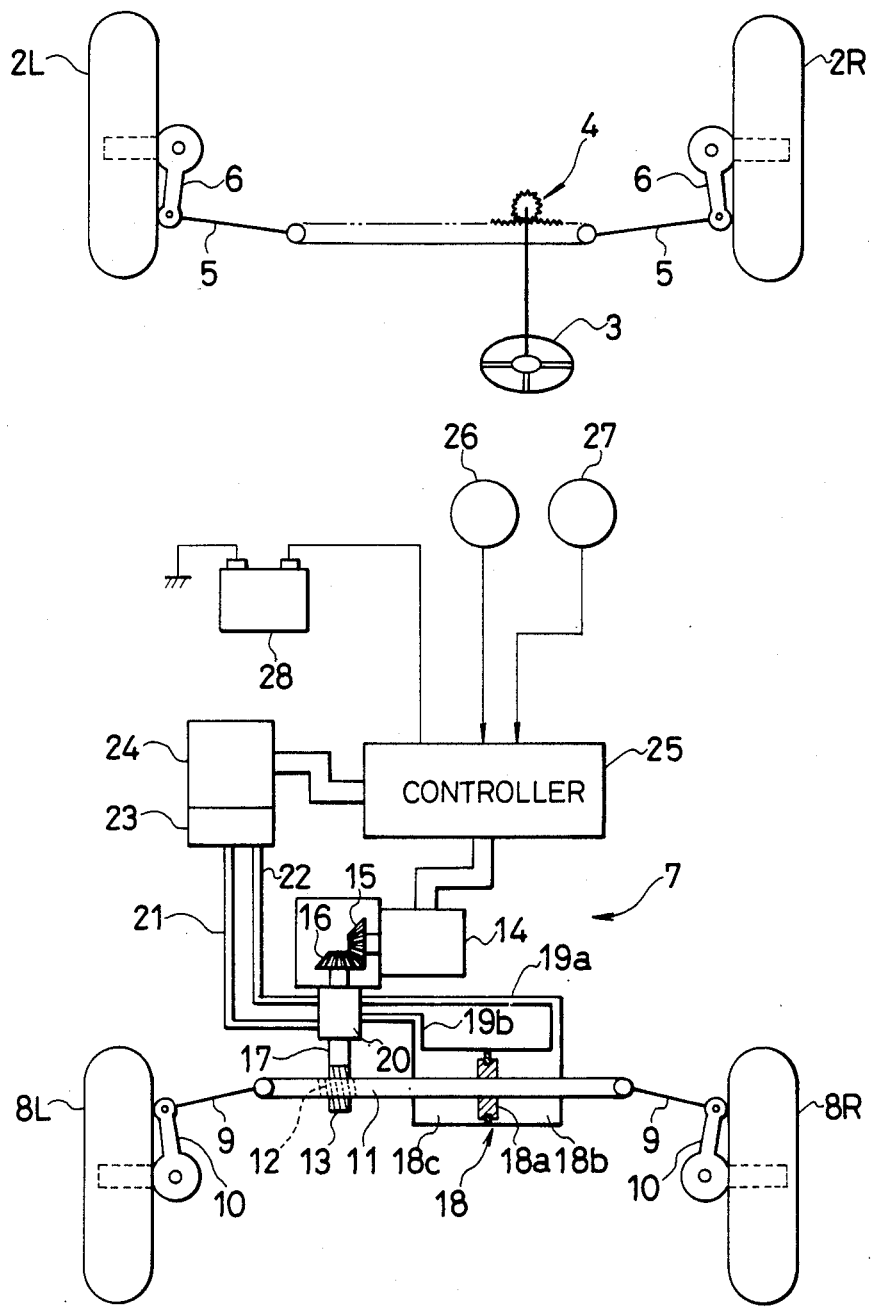
FIG. 1 is a diagrammatical illustration of a vehicle steering system in accordance with one embodiment of the present invention.

Referring to the drawings, particularly to FIG. 1, there is shown a vehicle steering system including a front wheel steering mechanism 1 which is adapted to steer a pair of front wheels 2R and 2L. The front wheel steering mechanism 1 includes a steering wheel 3 and a rack-and-pinion mechanism 4 which functions to convert a rotating movement of the steering wheel 3 into a linear movement. The front wheel steering mechanism 1 further includes tie-rods 5 and knucle arms 6 for transmitting the linear movement of the rack-and-pinion mechanism 4 to the front wheels 2R and 2L.

There is further provided a rear wheel steering mechanism 7 which is adapted to steer a pair of rear wheels 8R and 8L. The rear wheel steering mechanism 7 includes a transversely extending steering rod 11 which is connected with the rear wheels 8R and 8L through tie rods 9 and knucle arms 10. The rod 11 is formed with a rack 12 which is in meshing engagement with a pinion 13 formed on a pinion shaft 17. A pulse motor 14 is provided for driving the pinion shaft through bevel gears 15 and 16. It will therefore be understood that a rotation of the motor 14 causes a steering movement of the rear wheels 8R and 8L.

It will be noted in FIG. 1 that the rod 11 is provided with a power cylinder 18 through which the rod 11 is axially passed. In the cylinder 18, there is a piston 18a which is secured to the rod 11 and slidable in the cylinder 18 in the axial direction. The piston 18a divides the inside cavity of the cylinder 18 into a right chamber 18b and a left chamber 18c. When a hydraulic pressure is introduced into the right chamber 18b, the rod 11 is forced toward left to thereby produce a leftward steering movement of the rear wheels 8R and 8L. If however the hydraulic pressure is introduced into the left chamber 18c, the rod 11 is forced toward right causing a rightward steering movement of the rear wheels 8R and 8L.

There is provided a hydraulic pump 23 which is adapted to be driven by an electric motor 24 to provide a supply of a hydraulic pressure to the cylinder 18. The pump 23 is connected through a pressure line 21 and a return line with a control valve 20 which is in turn connected through a right passage 19a and a left passage 19b with the right chamber 18b and the left passage 18c, respectively. The control valve 20 functions to sense the direction of rotation of the pinion shaft 17 and connect the pressure line 21 to the passage 19a and connect the return line 22 to the passage 19b when the pinion shaft 17 is rotated in the direction of steering the rear wheels toward left. When the pinion shaft 17 is rotated in the direction of steering the rear wheels 8R and 8L toward right, the control valve 20 connects the pressure line 21 to the passage 19b and the return line 22 to the passage 19a. Thus, the operation of the steering effort of the pulse motor 14 is assisted by the hydraulic power assisting mechanism.

There is further provided an electronic controller 25 which produces output signals for operating the pulse motor 14 and the hydraulic motor 23. A steering angle detector 26 is provided for detecting the steered angle of the front wheels 2R and 2L. The steering angle detector 26 may be provided on the steering wheel 3 to detect the steered angle in terms of the angle of rotation of the steering wheel 3. A vehicle speed detector 27 is also provided to detect the vehicle speed. The signals of the detectors 26 and 27 are applied to the controller 25. Further, the controller 25 is connected with a vehicle electric power source such as a battery 28.

Figure 2:
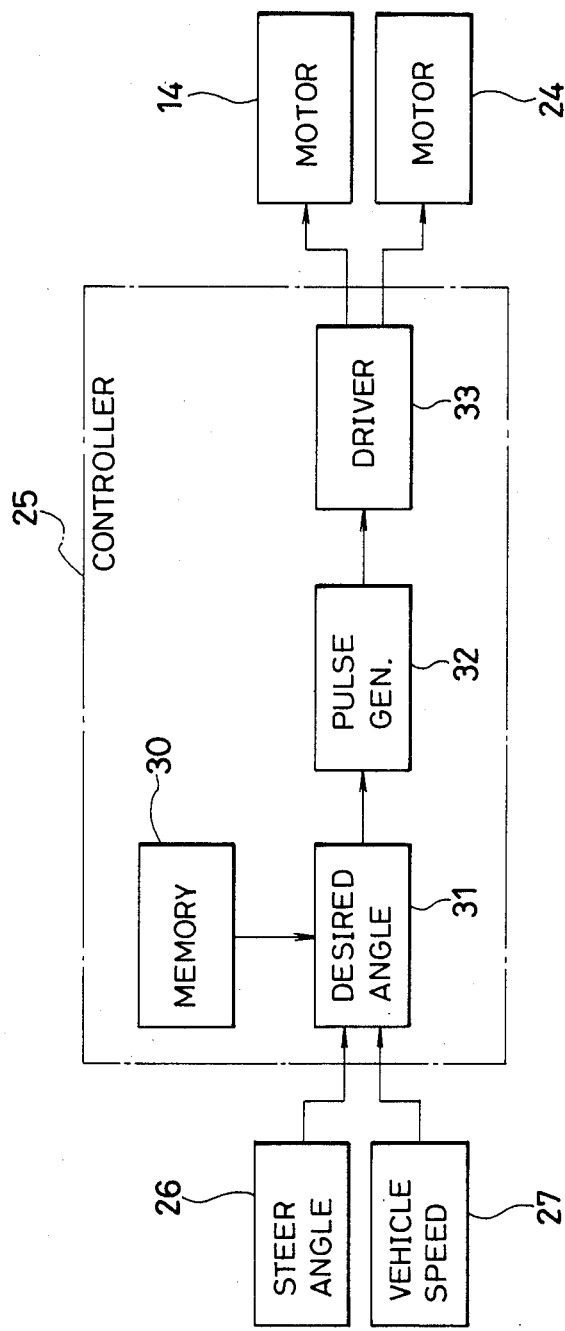
FIG. 2 is a block diagram showing one example of the control system.

Referring now to FIG. 2, it will be noted that the controller 25 includes a desired steering angle calculating circuit 31 which receives the signals from the detectors 26 and 27. The calculating circuit 31 is also connected with a memory 30 which memorizes steering angle ratios between the steering angle of the rear wheels 8R and 8L and the steering angle of the front wheels 2R and 2L. The controller 25 performs a calculation based on the signals from the detectors 26 and 27 and the data from the memory 30 to determine a desired steering angle of the rear wheels 8R and 8L. The output of the calculating circuit 31 is connected with a pulse generator 32 which produces pulse signals corresponding to the output of the calculating circuit 25. The output of the pulse generator 32 is connected with a motor driving circuit 33 which produces motor driving pulse signals for driving the pulse motor 14 and the motor 24 which drives the hydraulic pump 23.

Figure 3:
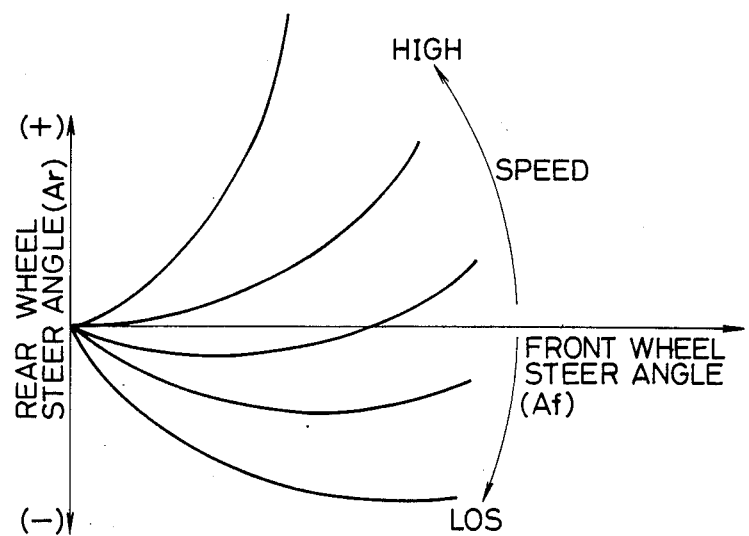
FIG. 3 is a diagram showing one example of the steering of the rear wheel in relation to the steering of the front wheel.

The memory 30 includes a memory of the ratios of the steering angle of the rear wheels 8R and 8L to the steered angle of the front wheels 2R and 2L as shown in FIG. 3, for example. As shown in FIG. 3, the ratio of the rear wheel steering angle Ar to the front wheel steering angle Af changes in accordance with the vhicle speed V. More specifically, the ratio takes a negative value when the vehicle speed is low. This means that the rear wheels 8R and 8L are steered in the direction opposite to the direction of the steering of the front wheels 2R and 2L. When the vehicle speed is high, however, the ratio takes a positive value which means that the rear wheels are steered in the direction which is the same as the steering direction of the front wheels. It will further be noted that the ratio is changed in response to a change in the front wheel steering angle Af so that the ratio is increased as the front wheel steering angle increases. This tendency is always true irrespective of the vehicle speed.

In operation, the controller 25 reads the desired steering angle of the rear wheels from the memory in the memory 30 based on the vehicle speed signal from the detector 27 and the steering angle signal from the dector 26 to determine the desired rear wheel steering angle Ar. The controller 25 then produces signals for operating the motors 14 and 24 so that the rear wheels are steered in accordance with the steering characteristics as shown in FIG. 3. Conventionally, the ratio has been maintained substantially constant irrespective of the front wheel steering angle Af. According to the present invention, however, the ratio is changed in accordance with a change in the front wheel steering angle as described above. In other words, the rear wheels are moved toward the direction of the front wheel steering movement as the front wheel steering angle increases. This steering movement of the rear wheel is effective to suppress the increase of the vehicle yaw rate in response to an increase in the front wheel steering angle.

Figure 5:
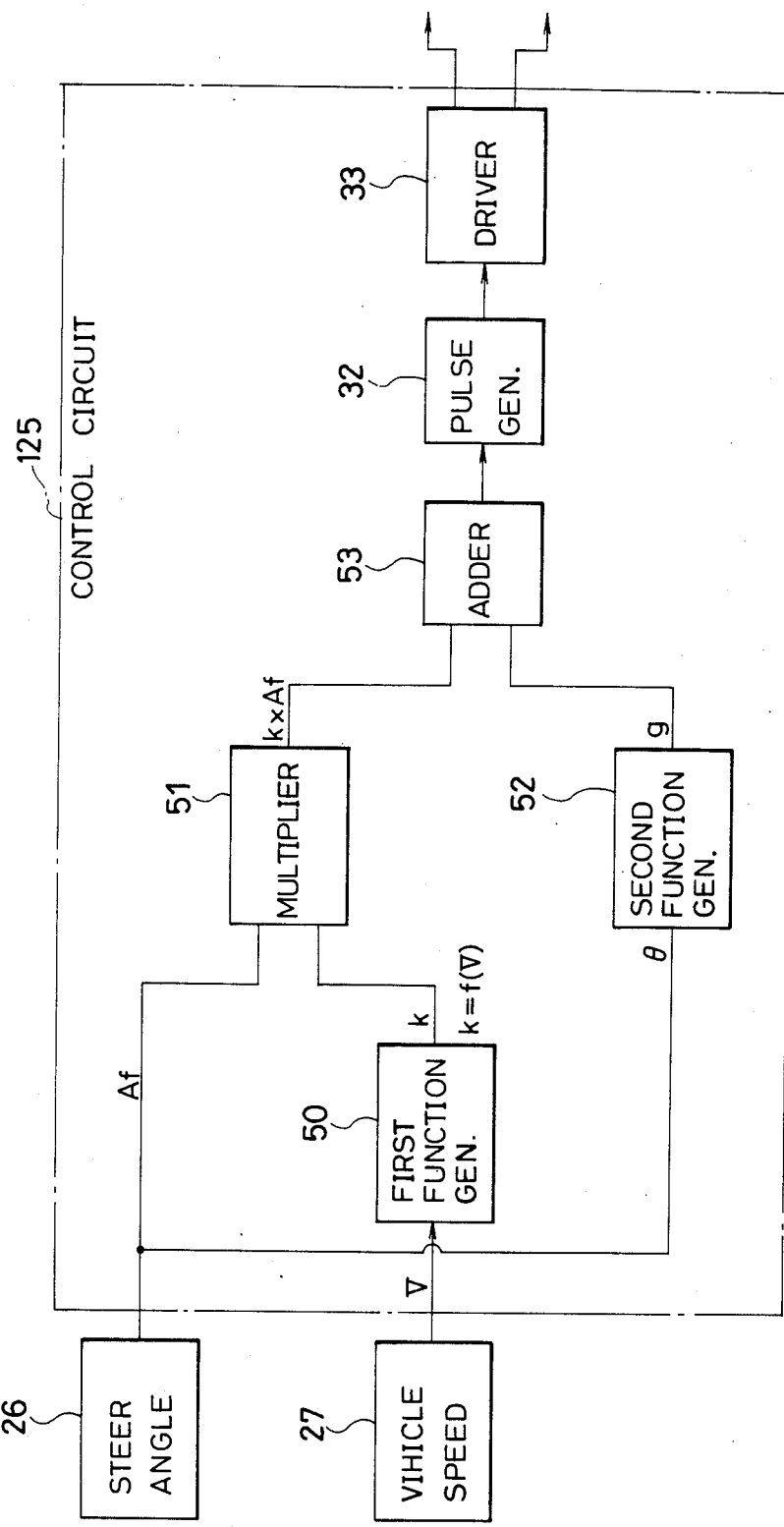
FIG. 5 is a block diagram showing another example of the control system which can be used in the steering system shown in FIG. 1.
Figure 6:
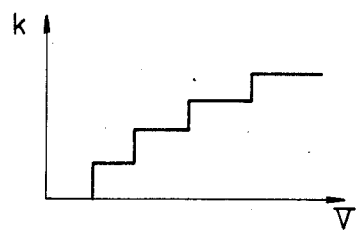
FIG. 6 is a diagram showing one example of the output of the first function generator in the control system shown in FIG. 5.
Figure 7:
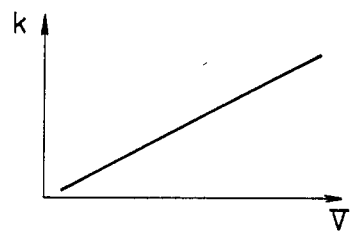
FIG. 7 is a diagram showing another example of the output of the first function generator.
Figure 8:
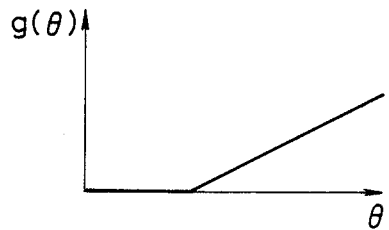
FIG. 8 is a diagram showing one example of the output of the second function generator in the control system shown in FIG. 5.
Figure 9:
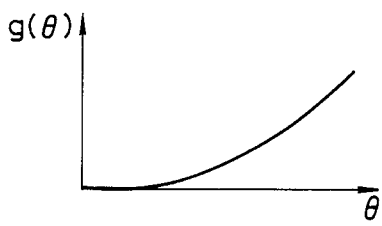
FIG. 9 is a diagram showing another example of the output of the second function generator.

FIG. 5 shows another example of the control circuit 127 which can be used in lieu of the control circuit 25 shown in FIG. 2. The circuit 125 shown in FIG. 5 includes a first function generator 50 which is connected with the output of the vehicle speed detector 27, and a second function generator 52 connected with the output of the front wheel steering angle detector 26. The first function generator 50 produces an output signal k which increases stepwisely or continuously in accordance with an increase in the vehicle speed V as shown in FIG. 6 or 7. The second function generator 52 produces an output g when the front wheel steering angle increases beyond a predetermined value. The output g of the second function generator 52 increases linearly or quadratically in accordance with an increase in the front wheel steering angle as shown in FIG. 8 or 9.

Figure 10:
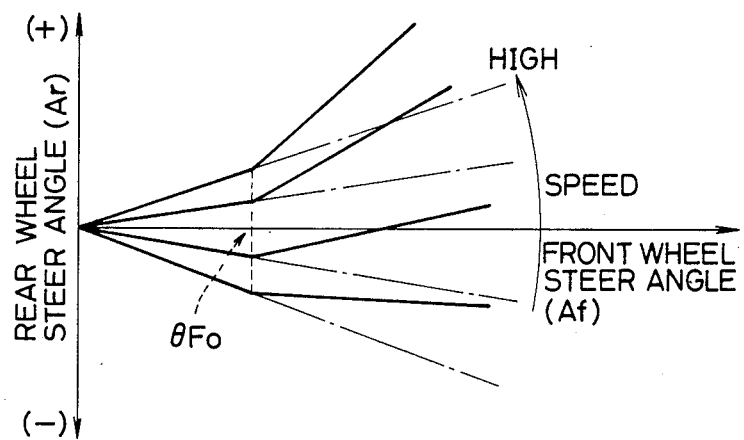
FIG. 10 is a diagram showing an example of the output of the control system shown in FIG. 5.

The output of the first function generator 50 is connected with an input of a multiplying circuit 51 which also receives a steering angle signal Af from the the detector 26. The circuit 51 functions to multiply the output of the first function generator 50 with the front wheel steering angle signal Af and applies its output to an adder 53. The output of the second function generator 52 is also applied to the adder 53 to be added with the output of the multiplying circuit 51. The output of the adder 53 is connected with a pulse generator 32 which has an output connected with a driving circuit 33 as in the control circuit 25. Consequently, the control circuit 125 produces an output by which the rear wheels 8R and 8L are steered in accordance with the characteristics as shown in FIG. 10.

Figure 4:
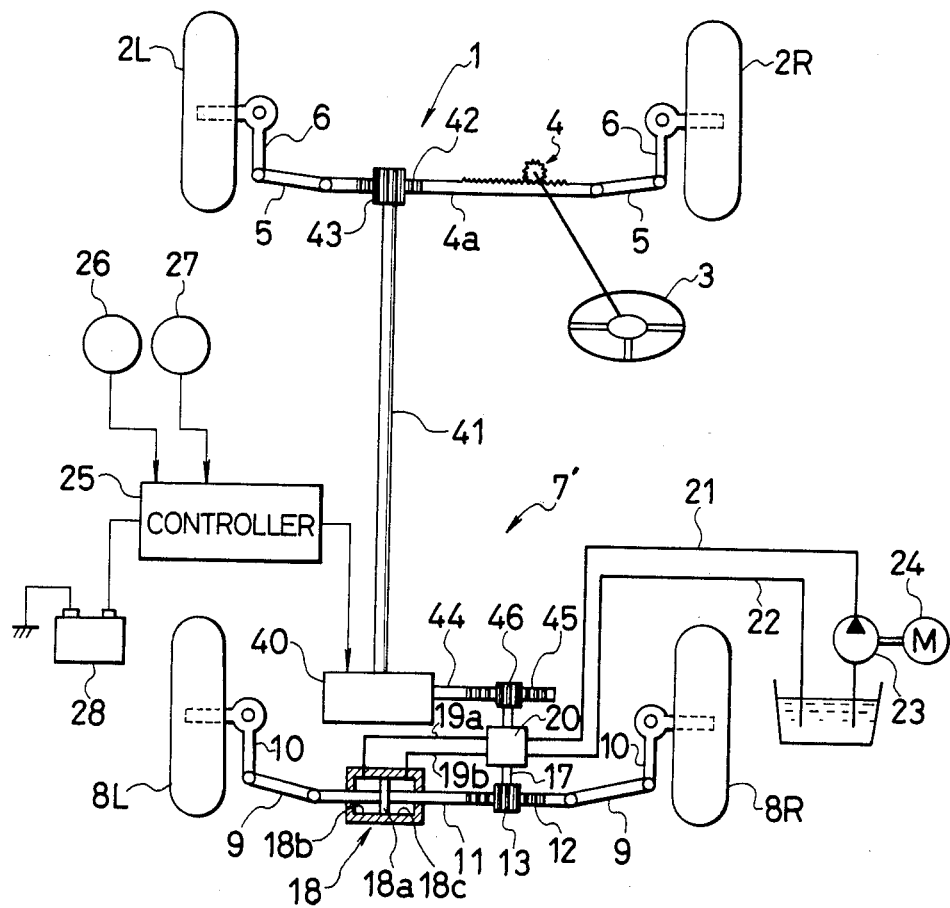
FIG. 4 is a diagrammtical view of a steering system similar to FIG. 1 but showing another embodiment.

Referring now to FIG. 4, there is shown an embodiment which includes a rear wheel steering mechanism 7' having a motion trasmitting rod 41. The rod 41 is provided at the front end with a pinion 43 which is in meshing engagement with a rack 42 formed in the rack shaft 4a of the front wheel steering mechanism 1. The rear end of the rod 41 is connected with a steering ratio changing unit 40 which may be of a type shown in the U.S. Pat. No. 4,572,316. The unit 40 has an output member 44 formed a rack 45 engaged with a pinion 46. The mechanical arrangement of the rear wheel steering mechanism 7' is substantially the same as that in the previous embodiment and includes a pinion shaft 17 on which the pinion 46 is formed. A hydraulic power assisting mechanism including a cylinder 18 and a valve 20 is also provided as in the previous embodiment. The steering ratio changing unit 40 is connected with a controller 25 of which details are shown in FIG. 11.

Figure 11:
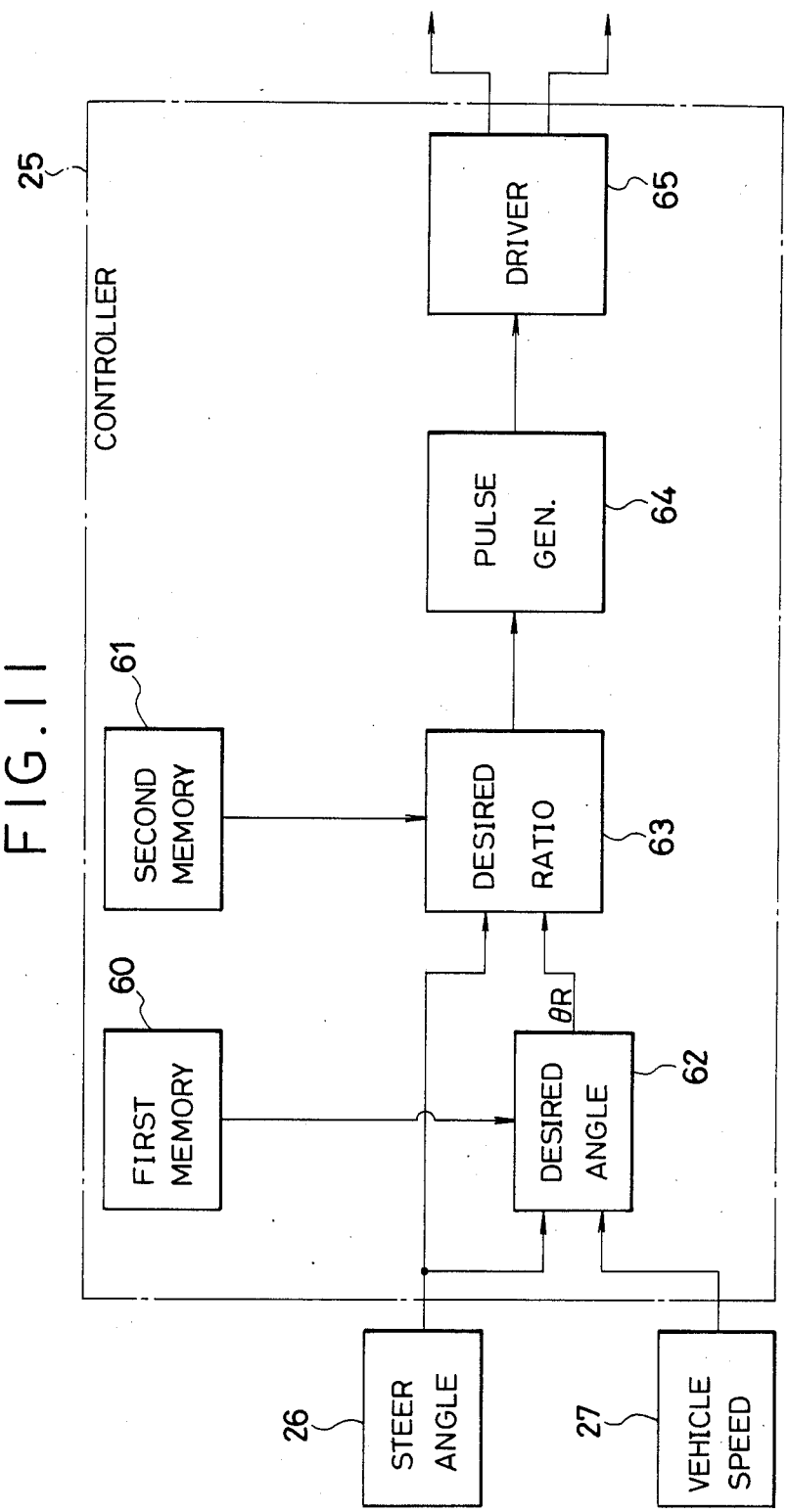
FIG. 11 is a block diagram showing another example of the control system which can be used in the steering system shown in FIG. 4; and, FIG. 12 is a diagram showing the operation of the control system shown in FIG. 11.
Figure 12:
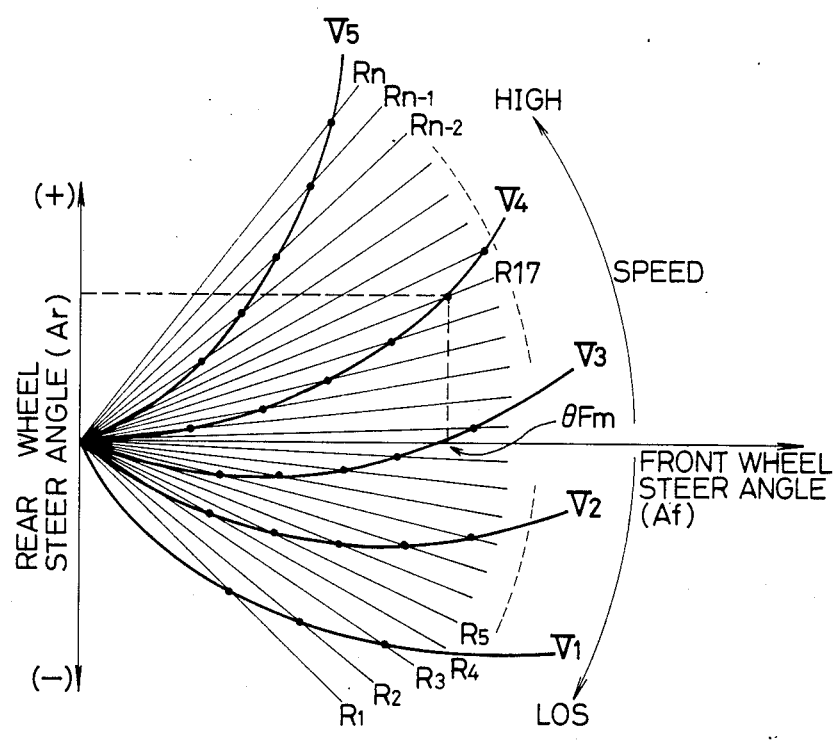

Referring to FIG. 11, the controller 25 includes a first memory 60 which memorizes data for desired rear wheel steering angles under various front wheel steering angles and under various vehicle speed, and a second memory 61 which memorizes desired ratios of the rear wheel steering angle to the front wheel steering angle under various vehicle speed as shown in FIG. 12. There is provided a desired rear wheel steering angle setting circuit 62 which is connected with the front wheel steering angle detector 26 and the vehicle speed detector 27 to receive signals therefrom. The circuit 62 reads the data in the first memory 60 based on the signals from the detectors 26 and 27 and produces an output for determining a desired rear wheel steering angle. The control circuit 25 further includes a desired ratio setting circuit 63 which is arranged to receive signals from the detector 26 and the circuit 62. The circuit 63 reads the data in the second memory 61 based on the signals from the detector 26 and the circuit 62 and produces an output signal for determining a desired ratio of the rear wheel steering angle to the front wheel steering angle. The output of the circuit 63 is applied to a pulse generator 64 which has an output connected with a motor driving circuit 65. The motor driving circuit 65 produces an output which is applied to the ratio changing mechanism 40 so that the steering motion of the front wheel steering mechanism 1 is transmitted to the rear wheel steering mechanism 7' at a desired ratio to produce a desired steering motion of the rear wheels. It will therefore be understood that the steering control in this embodiment is also effective to suppress an increase in the vehicle yaw rate under an increased front wheel steering angle.

The invention has thus been shown and described with reference to specific embodiments, however, it should be noted that the invention is in no way limited to the details of the illustrated arrangements but changes and modifications can be made without departing from the scope of the appended claims.

We claim:

1. A steering mechanism of a vehicle including front wheel steering means for steering front wheels of the vehicle, operating means for effecting a steering movement of said front wheel steering means to a desired angle, rear wheel steering means for steering rear wheels of said vehicle, control means for effecting a steering movement of said rear wheel steering means in relation with the steering movement of the front wheels, said control means including rear wheel steering angle setting means for determining a desired steering angle of the rear wheels in accordance with a steered angle of the front wheels and actuating means for moving said rear wheels to said desired steering angle of the rear wheels, characterized by front wheel steered angle detecting means for detecting the steered angle of the front wheels and producing a front wheel steered angle signal which is applied to said rear wheel steering angle setting means, said rear wheel steering angle setting means including means for determining said desired steering angle of the rear wheels so that a ratio of the steering angle of said rear weheel to the steering angle of said front wheel as considered in the same direction of steering is increased in accordance with an increase in the steered angle of the front wheel.

2. A steering mechanism in accordance with claim 1 in which said rear wheel steering means includes second operating means for effecting steering movement of said rear wheels, said control means including means for operating said second operating means so that the desired steering movement of the rear wheel is produced.

3. A steering mechanism in accordance with claim 1 in which said rear wheel steering angle setting means includes means for setting the desired steering angle of the rear wheels to a negtive value which produces a rear wheel steering movement in a direction opposite to a direction of the steering movement of the front wheels, said steering angle of the rear wheels in the opposite direction being decreased in response to an increase in the steering angle of the front wheels.

4. A steering mechanism in accordance with claim 1 in which said rear wheel steering means is interconnected with said front wheel steering means so that said rear wheels are steered in response to a steering movement of said front wheels, steering ratio setting means being provided between said front wheel steering means and said rear wheel steering means, said rear wheel steering angle setting means including means for controlling said steering ratio setting means so that said desired steering angle of the rear wheels is obtained.

5. A steering mechanism in accordance with claim 1 in which said rear wheel steering angle setting means includes means for setting the desired steering angle of said rear wheels to a negative value under a small steering angle of the front wheels and to a positive value under a large steering angle of the front wheels so that the rear wheels are steered in the opposite direction of the front wheels under the smaller steering angle and in the same direction of the front wheels under the large steering angle of the front wheels.

6. A steering mechanism in accordance with claim 5 in which said steering angle of the rear wheels in the negative value is decreased as the steering angle of the front wheels is increased and the steering angle of the rear wheels in the positive value is increased as the steering angle of the front wheels is increased.

* * * * *